United States Patent [19]
Plant et al.

[11] Patent Number: 5,102,678
[45] Date of Patent: Apr. 7, 1992

[54] METHOD AND APPARATUS FOR PRODUCING A SHAPED VEGETABLE PRODUCT

[75] Inventors: Rex B. Plant, Hamilton; John P. Marton, 14 Popular Ave., Sherwood, P.E.I., Canada, C1A 6S7

[73] Assignee: John P. Marton, Prince Edward Island, Canada

[21] Appl. No.: 525,691

[22] Filed: May 21, 1990

[51] Int. Cl.⁵ .................. A23P 1/00; A23N 3/00
[52] U.S. Cl. .................. 426/481; 99/542; 99/544; 99/547; 99/564; 426/484
[58] Field of Search .......... 426/481, 484, 518; 99/542, 544, 547, 564, 593; 30/113.1, 113.2, 113.3, 130, 301; 83/178, 656

[56] References Cited

U.S. PATENT DOCUMENTS

| | | | |
|---|---|---|---|
| 1,727,376 | 9/1929 | Mehserle | 99/547 |
| 3,933,085 | 1/1976 | Rejsa | 99/544 |
| 3,937,850 | 2/1976 | Farha et al. | 426/484 |

*Primary Examiner*—George Yeung
*Attorney, Agent, or Firm*—Smart & Biggar

[57] ABSTRACT

A method and apparatus for producing a product of predetermined shape from a vegetable, in which the vegetable is split and the opposed sections are scooped out. In another aspect of the invention a shaft penetrates the vegetable and blades are laterally flexed to carve out a cavity when the shaft is rotated. In still another aspect of the invention a pair of sloping U-shaped cutters move together into the vegetable and a U-shaped knife in each of the cutters rotates to form a heart-shaped core.

4 Claims, 6 Drawing Sheets

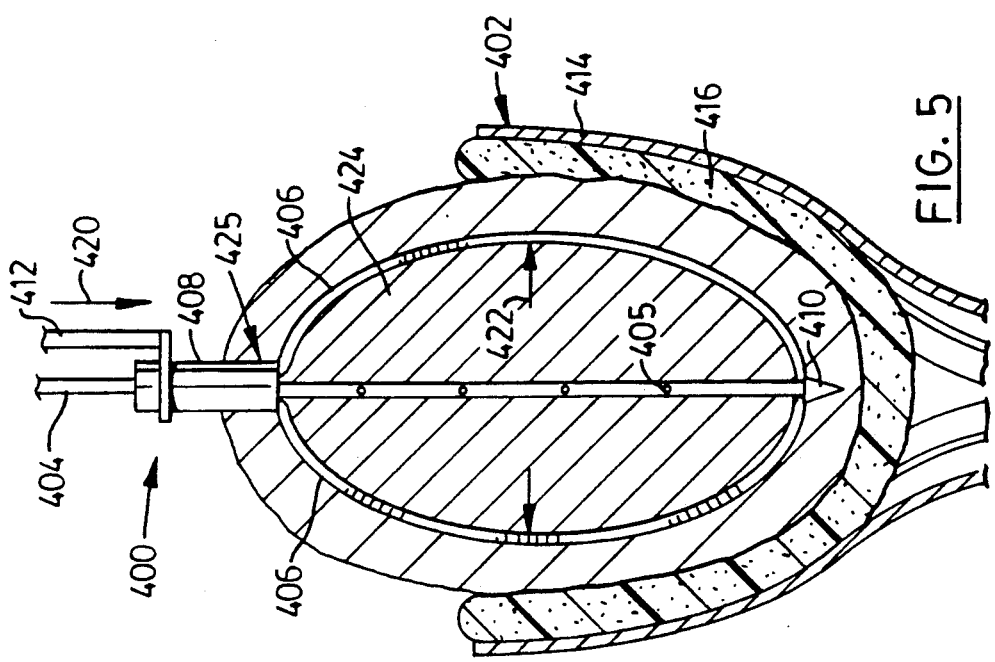
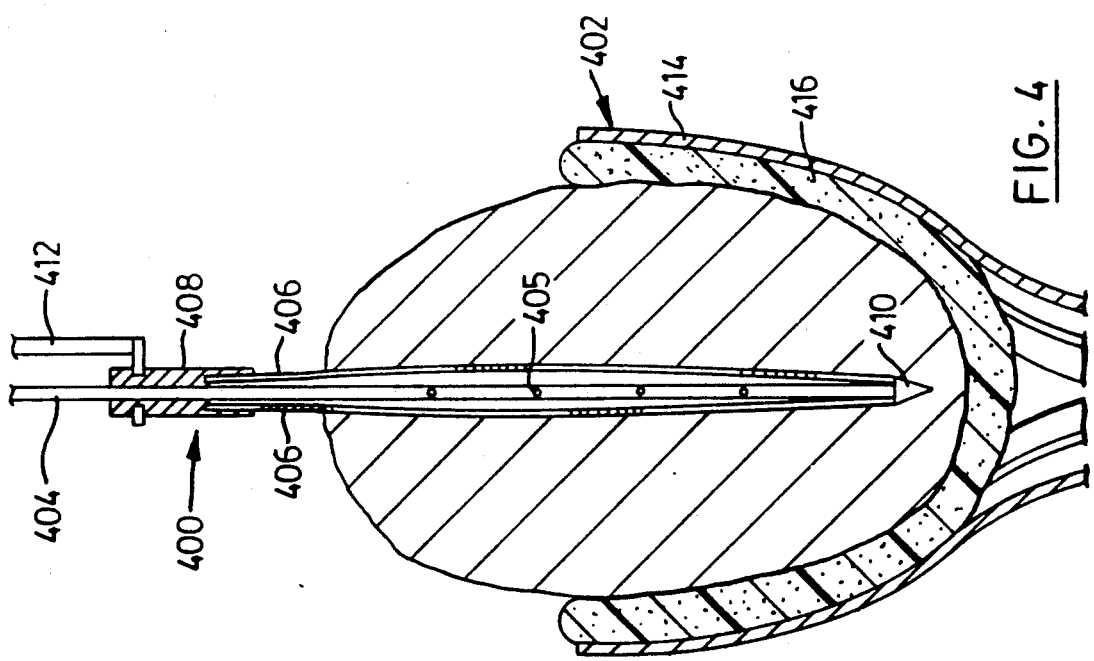

METHOD AND APPARATUS FOR PRODUCING A SHAPED VEGETABLE PRODUCT

FIELD OF INVENTION

This invention relates to a method and an apparatus for mechanically cutting food produce into shaped configurations.

BACKGROUND OF THE INVENTION

It has long been known to cut, by hand, vegetables and the like into various shaped configurations for decorative purposes. It has also been long known to use a mechanical apparatus to cut vegetables into various simple, generally longitudinal shapes. For example, a CUISINART (a trade-mark) can be used to cut food produce into strips or juliennes and the like.

However, such known methods and apparatus cannot be applied on an industrial level where a high volume of produce is to be cut into complex, generally non-longitudinal shapes.

In our U.S. Pat. Application Ser. No. 354,940 filed May 22, 1989, now U.S. Pat. No. 5,060,563, we disclose ways to automatically cut vegetables into certain particular shapes. It is an object of the present invention to provide an improved method and apparatus for automatically cutting produce into certain other shaped configurations.

STATEMENT OF THE INVENTION

In accordance the present invention, there is provided, a method and an apparatus for producing a product of predetermined shape from a vegetable, in which the vegetable is split and the opposed sections are scooped out. In another aspect of the invention a shaft penetrates the vegetable and blades are laterally flexed to carve out a cavity when the shaft is rotated. In still another aspect of the invention a pair of sloping U-shaped cutters move together into the vegetable and a U-shaped knife in each of the cutters rotates to form a heart-shaped core.

BRIEF DESCRIPTION OF THE DRAWINGS

Example embodiments of the invention are shown in the accompanying drawings in which:

FIG. 4 is a view similar to FIG. 3 showing the apparatus penetrating the vegetable;

FIG. 5 is a view similar to FIG. 4 showing the apparatus expanded within the vegetable to cut out the core;

DESCRIPTION OF PREFERRED EMBODIMENT

Figure 1:
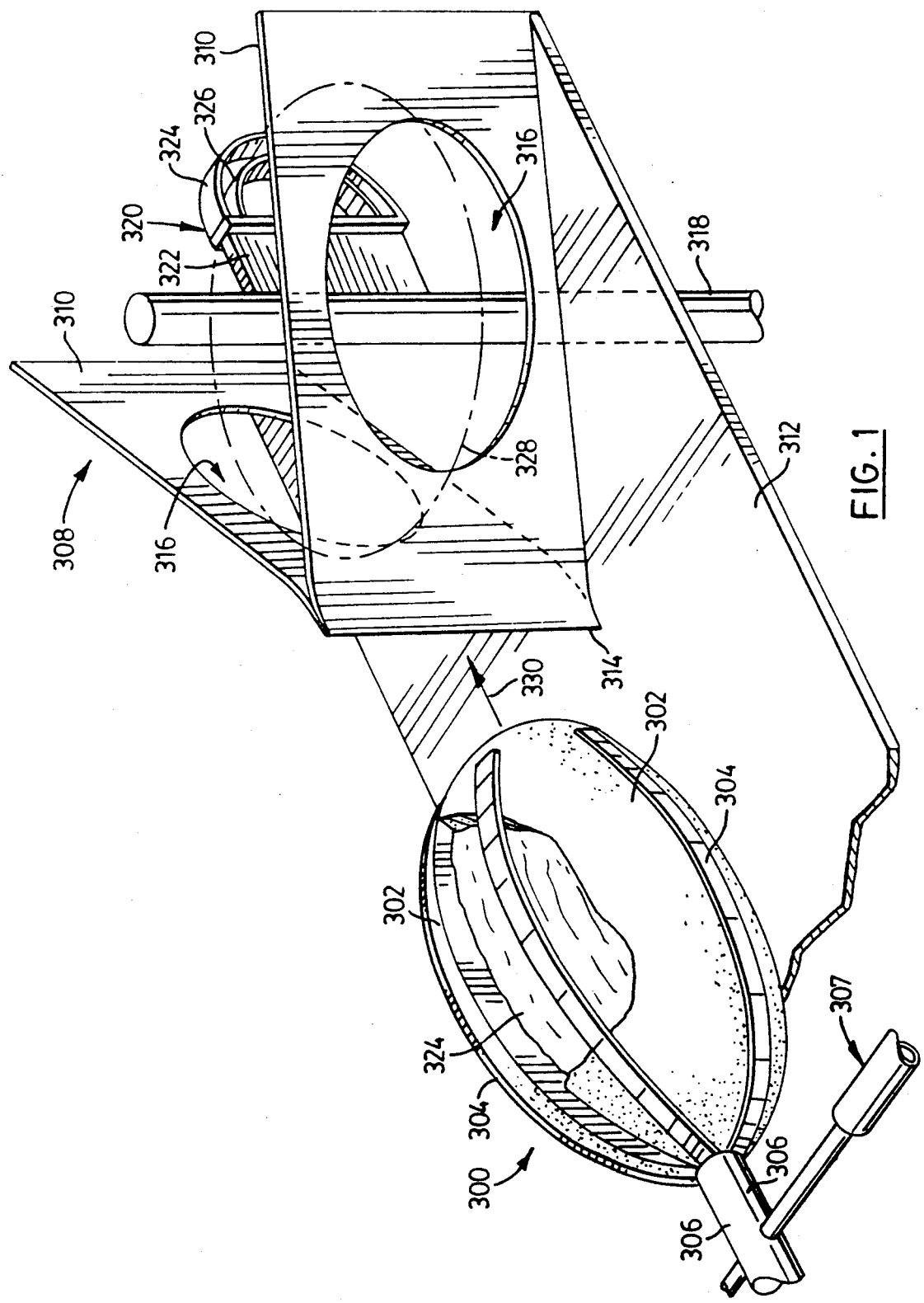
FIG. 1 is a perspective view of a first embodiment showing a cutting apparatus of the invention producing a scooped out vegetable product.
Figure 2:
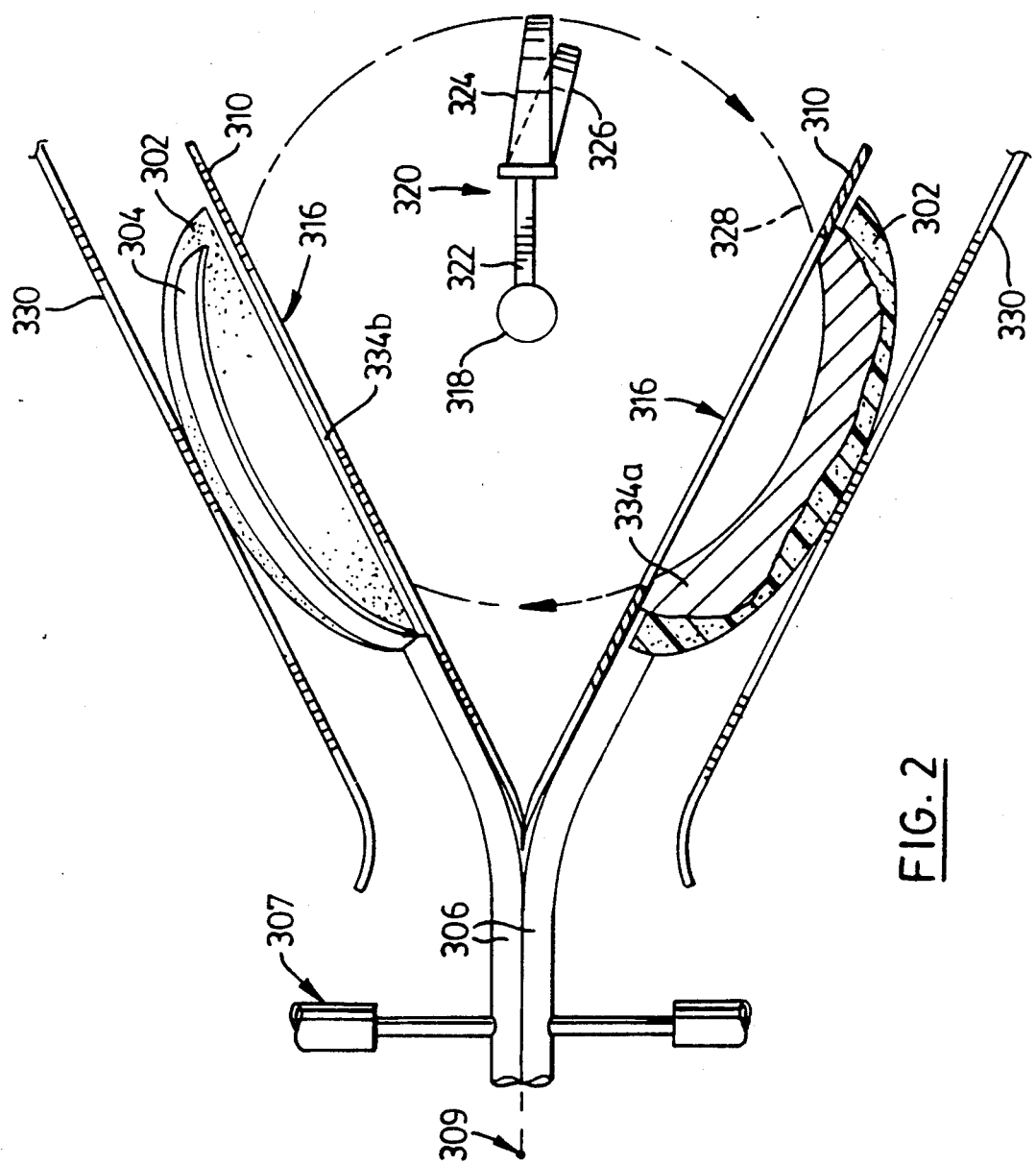
FIG. 2 is a plan view, partly in cross-section, of the apparatus of FIG. 1 in operation.

The first embodiment of FIGS. 1 and 2 consists of a carrier 300 which comprises an inner lining forming a bifurcated shell with pair of semi-elliptical cups 302 of resilient material such as foam rubber, each cup being carried by a plurality of leaf springs 304. Springs 304 are carried by a pair of laterally flexible shafts 306 which are movable laterally by a pair of cylinder and piston assembles 307 pivotable about a point 309.

Carrier 300 is positioned adjacent a cutting device 308 which comprises a pair of upright face plates 310 resting on a platform 312 and converging to form a vertical knife 314. Centrally located in each face plate 310 is an elliptical aperture 316. An axially rotatable vertical shaft 318 lies between plates 310 and a knife assembly 320 projects laterally from the shaft. Knife assembly 320 comprises a flange 322 carrying a pair of concentric semicircular knives 324 (outer) and 326 (inner) sharpened at their leading edges 327. The arc of rotation, indicated by arrow 328, of knives 324, 326 passes through opposed apertures 316. Inner knife 326 is slightly advanced over outer knife 324 with respect to arc 328, which facilitates the cutting operation. Knife assembly 320 is interchangeable to provide other configurations. An additional knife assembly (not shown) may be attached to shaft 318 diametrically opposed to assembly 320. A guide plate 330 (shown only in FIG. 2) lies parallel to each face plate 310.

In the operation of the device of FIGS. 1 and 2 a vegetable, shown in the drawings as a potato 334, is placed between cups 302 in carrier 300 which is then closed by the action of cylinder and piston assemblies 307. Carrier 300 is advanced towards cutting device 308 in the direction of arrow 330, allowing knife 314 to pass between cups 302 and engage potato 334. As carrier 300 advances, knife 314 splits potato 334 in half and the two resultant sections 334a an 334b of the potato slide over the face of plates 316 until they come to rest covering apertures 316, as seen in FIG. 23. Guide plates 330 bear laterally against springs 304 to press potato segments 334a, 334b against face plates 310, whereupon shaft 318 is rotated 360° to pass through that portion of each potato section exposed in apertures 316, thereby scooping out the exposed portions of both potato sections. Knife 324 is advanced over knife 326 to facilitate the cutting operation. After shaft 318 has been rotated, carrier 300 is withdrawn and cylinder and piston assembly 307 opens the carrier which allows hollowed potato segments 334a, 334b to drop from cups 302. Carrier 300 is then closed again on another potato by cylinder and piston assemblies 307. Potato segments 334a, 334b are collected by a suitable arrangement not shown and the material scooped from the segments by knives 324, 326 is also collected in a suitable manner when it drops below cutting device 308.

Figure 3:
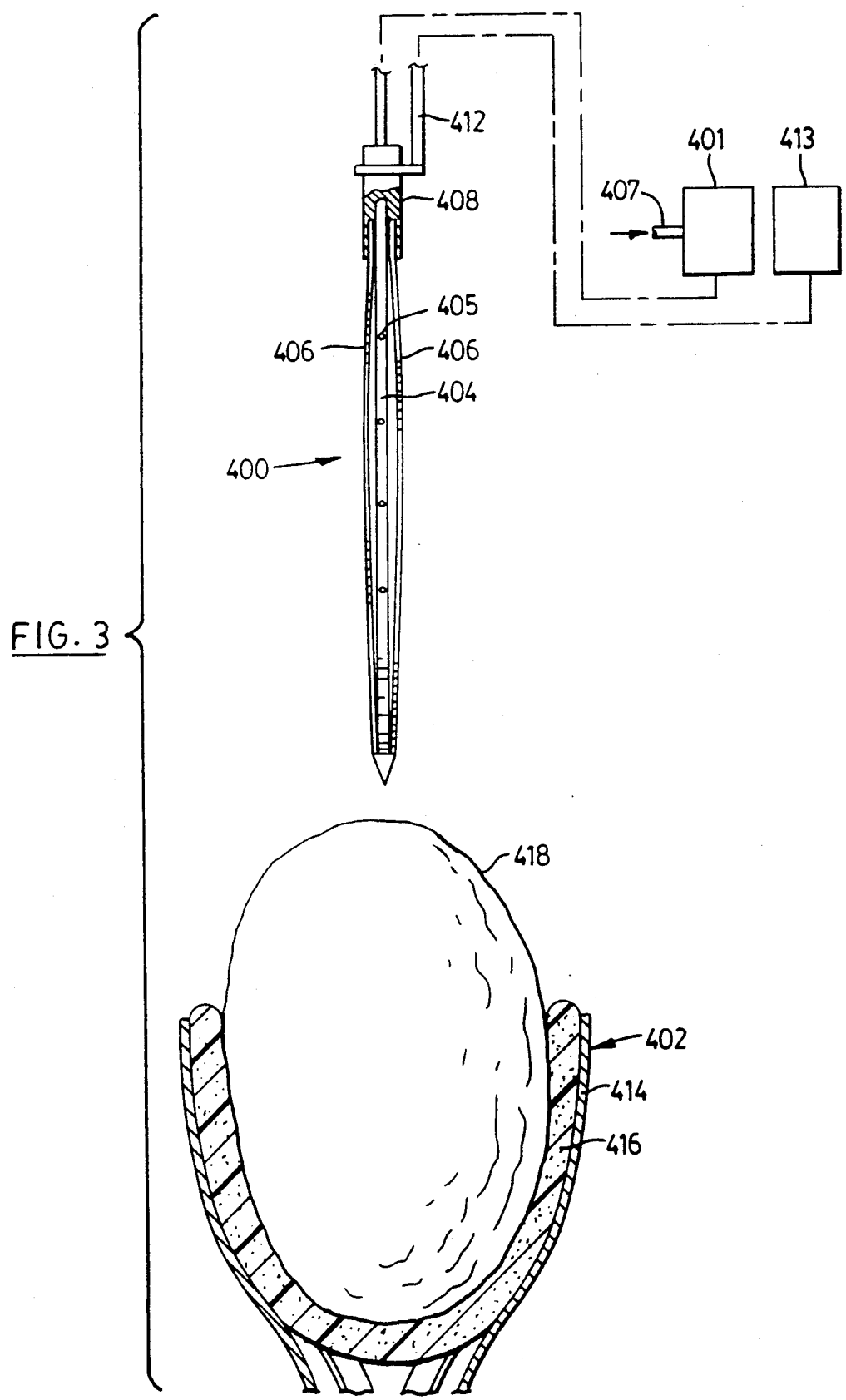
FIG. 3 is a side view of a second embodiment of the invention, partly in cross-section, showing a cutting apparatus for producing a hollow vegetable product.

In the second embodiment shown in FIGS. 3 to 5 of the drawings a boring tool 400 is mounted on a drive unit 401 such as a drill press located directly above a support 402. Boring tool 400 comprises a vertical shaft 404 carrying a plurality of spring blades 406 lying parallel to the shaft. Shaft 404 is tubular and has a plurality of lateral orifices 405 located between collar 408 and socket 410. Drive unit 401 includes a fluid inlet line 407 for feeding fluid into shaft 404. Blade 406 are held at one end by a collar 408 slidable on shaft 404 and held at the other end in a socket 410 which also forms a piercing end to the shaft. A push rod 412, parallel to shaft 404, is mounted at one end on a drive unit 413 fixed to collar 408. Support 402 comprises a plurality of fingers 414 with an inner lining forming a cup 416 of suitable cushioning material.

In the operation of the device of FIGS. 3 to 5 a vegetable, shown in the drawings as a potato 418, is placed in cup 402. Shaft 402 of boring tool 400 is then lowered to pierce potato 418, as seen in FIG. 4, until socket 410 is located adjacent the lower end of the potato and lining 416. Next, push rod 412 is moved in the direction of arrow 420, as seen in FIG. 5, which causes blades 406 to flex laterally in the direction of arrows 422. Shaft 404 is then rotated to carve a cavity in the central portion 424 of potato 418. The loose material lying in central portion 424 is flushed from the potato 418 by injecting fluid through shaft 404 which enters the central portion through orifices 405 and carries the loose material out through an aperture 425 which is formed by collar 408 and opened when the collar is withdrawn by push rod 412.

Figure 6:
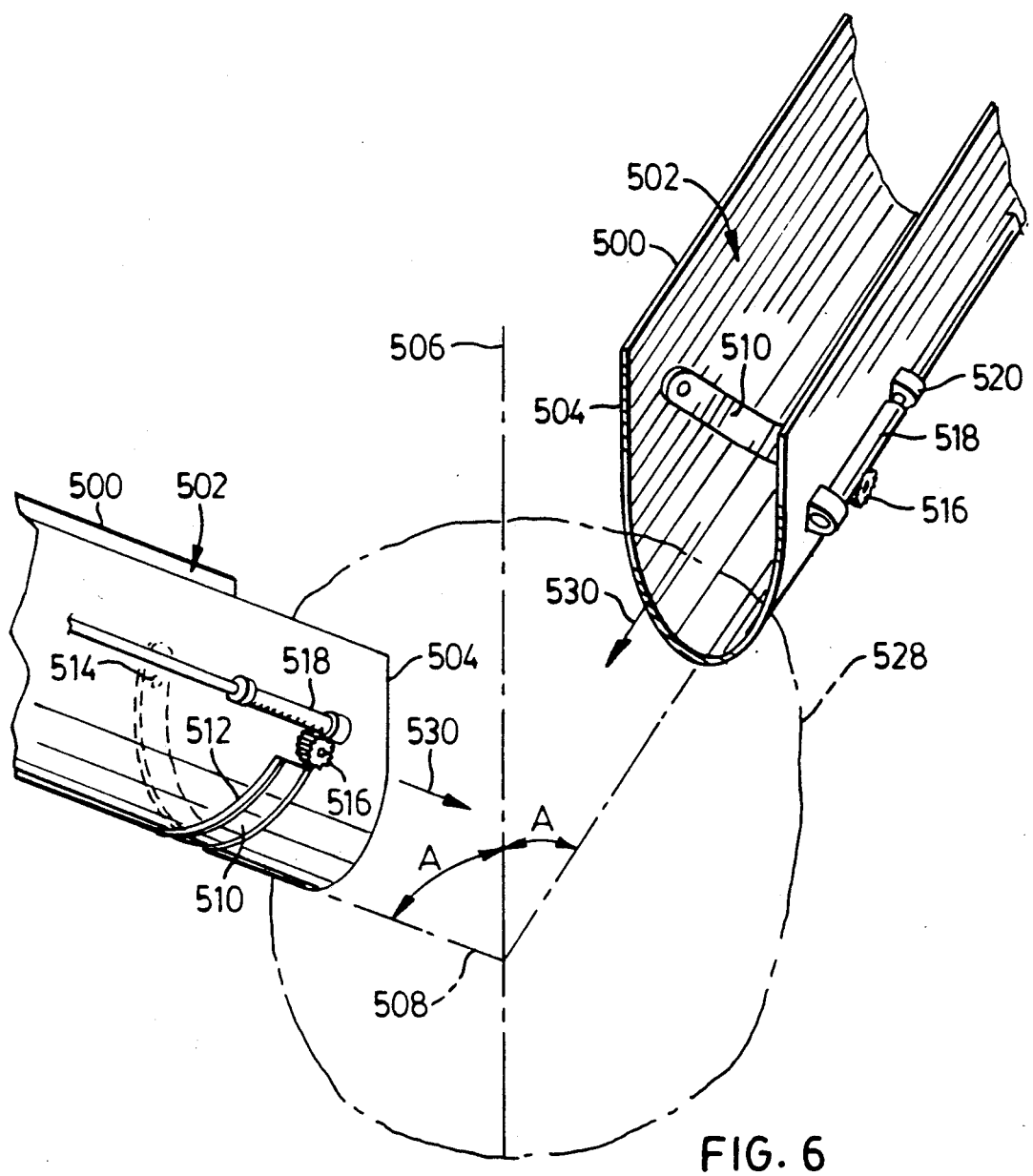
FIG. 6 is a perspective view of a third embodiment showing a cutting apparatus which produces a heart-shaped vegetable product.
Figure 9:
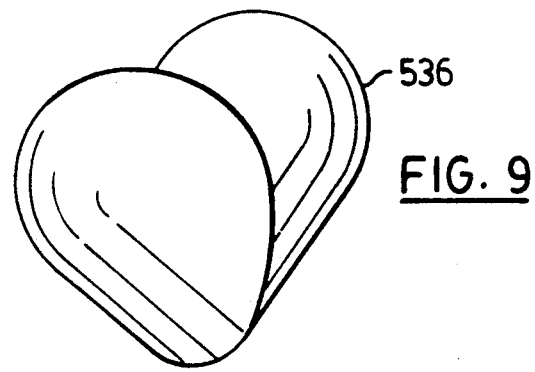
FIG. 9 shows the product produced by the apparatus of FIGS. 6, 7 and 8.
Figure 7:
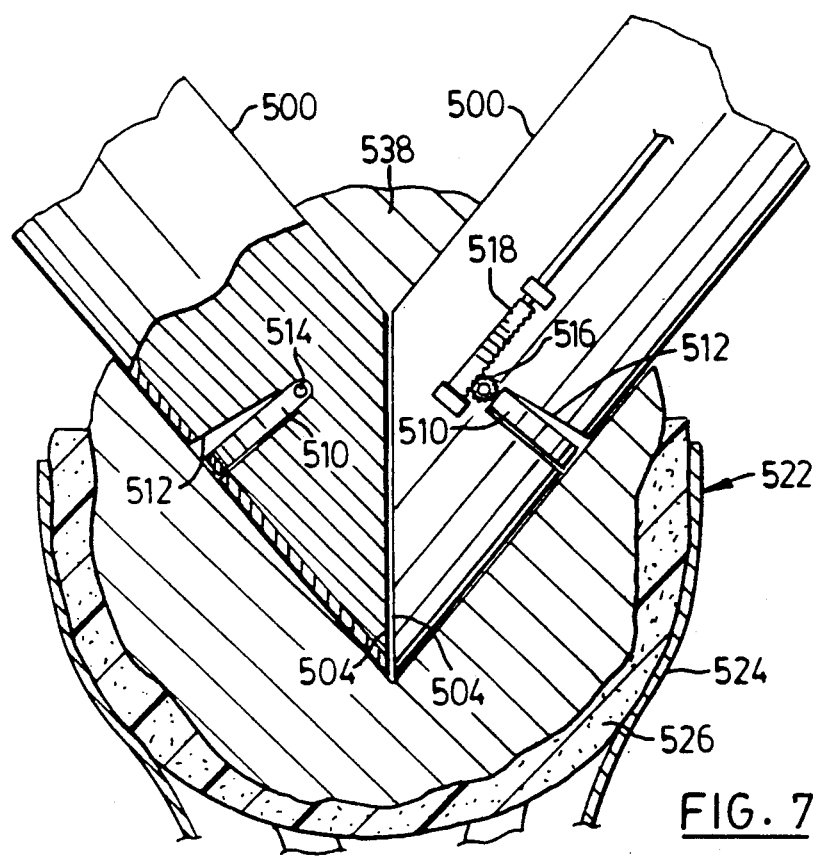
FIG. 7 is a side view of the apparatus of FIG. 6 penetrating the vegetable.
Figure 8:
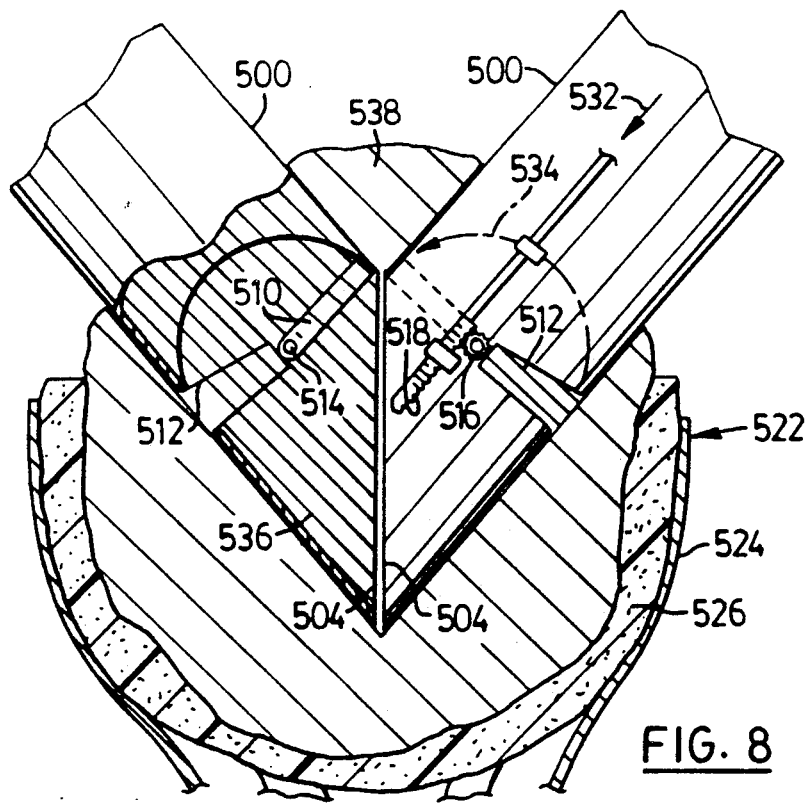
FIG. 8 is a view similar to FIG. 7 showing the cutting knives of the apparatus operating to shape the product.

The third embodiment shown in FIGS. 6 to 8 of the drawings consists of a pair of opposed downwardly sloping cutters 500 which are each contoured in cross-section to provide a U-shaped channel 502 with one end bevelled to form a cutting edge 504 lying parallel to a vertical plane 506. Cutters 500 are positioned to have their axes 508 meet at an angle A of about forty degrees to plane 506 whereby each cutting edge slopes at an angle of about forty degrees with respect to cutter axis 508. Each cutter 500 carries a U-shaped knife 510 which rests in a slot 512 at the bottom of channel 502 in the contour of the channel. Each knife 510 is pivotally mounted at each end to the cutter by a pin 514 fixed to the knife and freely rotatable in the cutter. One pin 514 carries a pinion 516 located on the outside surface of the cutter and engaged by a rack 518 slidably mounted on bosses 520 attached to the outer surface of the cutter. Slot 512 is configured to allow knife 510 to clear the bottom of channel 502 when the knife rotates, as seen in the drawings.

Cutters 500 are positioned above a support 522 (see FIGS. 7 and 8) which comprises a plurality of fingers 524 with an inner lining forming a cup 526 of suitable cushioning material.

In the operation of the embodiment of FIGS. 6 to 8, a potato 528 (or other suitable vegetable or fruit) is placed in support 522 which is centred with respect to vertical plane 506. Cutters 500 are then moved forward longitudinally in the direction of arrows 530 to cut into the potato and to meet whereby cutting edges 504 abut one another in vertical plane 506. In the next step racks 518 of each cutter 500 are advanced in the direction of arrow 532 (see FIG. 8) which rotates knives 510 in a circular arc indicated by arrow 534 in FIG. 8. Knives 510 are advanced past plane 506 sequentially to provide a complete cut. It will be seen that the action of cutters 500 and knives 510 produces a heart-shaped core 536 which is removable after breaking away cap 538 of the potato formed by the cutting operation.

We claim:

1. A method of producing a product of predetermined shape from a vegetable, comprising the steps of:
    placing the vegetable in a support to lie in a predetermined vertical plane;
    moving a pair of cutters towards one another to abut in said plane within the vegetable, each cutter having a downwardly sloping U-shaped channel member with the lower end thereof forming a cutting edge lying in a vertical plane and having a U-shaped knife pivotally mounted therein lying in the contour of the channel member; and
    rotating the knives in a circular path to meet in said plane whereby a heart-shaped core is formed in the vegetable.

2. An apparatus for producing a product of predetermined shape from a vegetable, comprising:
    a downwardly sloping pair of cutters each having an upwardly opening U-shaped channel member with the lower end thereof forming a cutting edge lying in a vertical plane;
    a pair of U-shaped rotatable knives pivotally mounted at each end thereof, one of the knives being located within each of the cutters and lying in the contour of the channel member;
    means to support a vegetable below the cutters to lie in a predetermined vertical plane; and
    means to move the cutters longitudinally, and to rotate the knives upwardly in a circular arc, to abut one another in said vertical plane to form a heart-shaped core in the vegetable.

3. An apparatus as claimed in claim 2 in which the support means comprises a cup having a resilient inner lining.

4. An apparatus as claimed in claim 2 which the means to rotate the knives upwardly comprises rack and pinion means mounted on the outer side of each of the cutters.

* * * * *